April 25, 1961 L. KAUFOLD ET AL 2,981,842
AUTOMATIC GRID SCANNING TRACKER
Filed Sept. 1, 1953 3 Sheets-Sheet 1

INVENTORS:
Leroy Kaufold
Preston C. Cox
By Hubert E. Metcalf
Their Patent Attorneys April 25, 1961  L. KAUFOLD ET AL  2,981,842
AUTOMATIC GRID SCANNING TRACKER
Filed Sept. 1, 1953  3 Sheets-Sheet 3

INVENTORS:
Leroy Kaufold
Preston C. Cox

By Hubert E. Metcalf
Their Patent Attorneys

United States Patent Office 2,981,842
Patented Apr. 25, 1961

2,981,842
AUTOMATIC GRID SCANNING TRACKER

Leroy Kaufold, Santa Barbara, and Preston C. Cox, Burbank, Calif., assignors to Northrop Corporation, Hawthorne, Calif., a corporation of California Filed Sept. 1, 1953, Ser. No. 377,816

16 Claims. (Cl. 250—83.3)

The present invention relates generally to automatic trackers for tracking radiant source objects such as a star and more particularly to an automatic tracking system using an oscillating mirror and stationary grid scanning system for tracking radiant source objects.

The presence of the sun in the daytime renders the problem of star tracking much more difficult than nighttime tracking since, in general, there is only the moon to contend with at night and it is of far less brightness than the sun. However, when a star is being tracked near the moon at night, sky gradient presents disturbances that cannot be ignored. It is evident that a 24 hour tactical star tracker must overcome a wide range of obscuring (blanketing) light to derive a useful signal.

It is an object of this invention to provide scanning means and a control network for an automatic star tracker which discriminates against obscuring noise signals.

It is another object of the invention to provide scanning means for modulating the star signal in a manner suitable for separation from other signals.

Another object of the invention is to provide a control network and photosensitive means responsive during all hours for star tracking.

A further object of the invention is to provide new means for establishing elevation and azimuth error signals for accurate positioning of a tracking telescope.

Briefly, the foregoing and other objects are preferably accomplished by providing a sighting mirror positionable in elevation and azimuth and cooperating with a reflecting type telescope carrying an oscillating mirror therein to displace the star image in a square path over the face of a stationary grid located at the focal plane of the telescope. The grid has alternate clear and opaque spacings which are parallel to a diagonal of a square along the edges of which is moved the star image. An infrared sensitive photocell located behind the grid puts out a sequence of pulses in accordance with the star path traced across the grid. This series of pulses is amplified and passed through a narrow band pass filter which puts out a modulated carrier at the grid interruption frequency. The carrier is not modulated when there is no error, i.e., the star is on the optical axis of the telescope because the sighting mirror is correctly oriented. The envelope of the modulated signal is detected and compared with a reference signal of the oscillating mirror frequency of scan and also with another reference signal which is separated by 90° in phase with the first reference signal. These comparisons produce two error signals which are independently used to control elevation and azimuth of the sighting mirror through respective power control bridges that apply power to an elevation motor and an azimuth motor to drive the sighting mirror such that the error is removed.

The invention will be more fully understood by reference to the accompanying drawings, in which.

Figure 1:
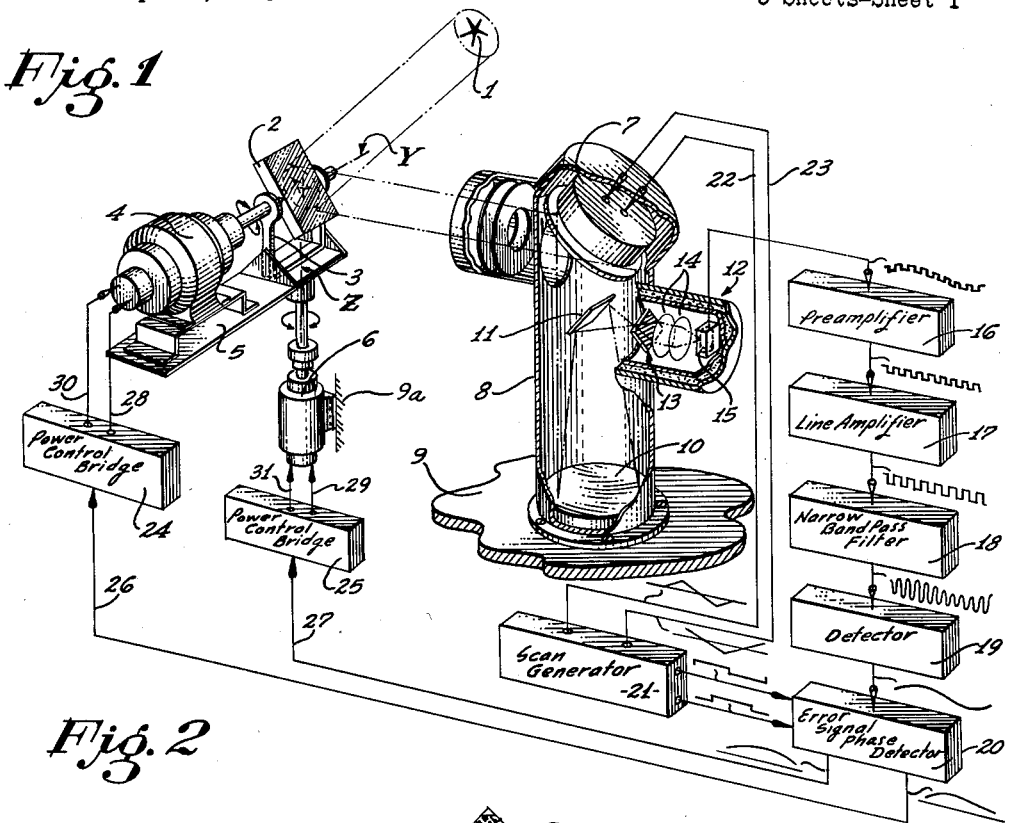
Figure 1 is a diagrammatic block perspective of a preferred embodiment of an automatic radiant source object tracker.

Referring first to Figure 1, there is shown a schematic, block diagram illustration of a preferred embodiment of an automatic tracking system. A star 1, for example, is the radiant source object to be tracked in this case. Star 1 is sighted by a mirror 2 which is rotatable about two axes, designated Y and Z, which are the elevation and azimuth rotation axes, respectively. The mirror 2 is actually suspended in a yoke 3 which also carries elevation drive motor 4 on a platform 5 rigidly attached to yoke 3. This permits azimuth drive motor 6 to function independently of interaction with the elevation control by driving the entire yoke assembly. The star image reflected by mirror 2 is intercepted by an oscillating mirror assembly 7 mounted at 45 degrees to the optical axis of a reflecting telescope 8, which is firmly mounted on a stable platform 9. Drive motor 6 is fastened to a bracket 9a (partially shown) which is in turn attached to platform 9. The star image reflected by the oscillating mirror assembly 7 is further reflected by a lower concave telescope mirror 10, and is again reflected by a small, centrally located plane mirror 11 which is also mounted at 45 degrees with the telescope optical axis above concave mirror 10 to deflect the star image out of the telescope housing through an aperture in the side thereof. An insulated container 12 is attached to this opening as shown. Just following the aperture is mounted a grid 13, located at the focal plane of the telescope mirror 10. A set of collimating lenses 14 is located behind the grid 13 and before photocell 15, which is for example a lead sulfide, infrared sensitive cell. Container 12 is a double walled enclosure packed between the walls with ethylene dichloride frozen solid at −70° C. The latent heat of fusion of ethylene dichloride yields a refrigerating action in container 12 which is necessary to keep the lead sulfide cell in a condition of maximum sensitivity.

The output of the lead sulfide cell, which is normally a series of pulses, is fed to a preamplifier 16 as indicated in the single line diagram of Figure 1. The output of the preamplifier 16 is further amplified by line amplifier 17 and applied to a narrow band pass filter 18, for example, a .5 cycle bandwith, high "Q" filter. The output of filter 18 is generally a modulated signal, the envelope of which is detected by detector 19. This signal is in turn fed into an error signal phase detector 20 which compares the phase relation between the detector output signal and a reference signal which is of the same frequency as the drive signals for oscillating mirror assembly 7. A second reference signal which is separated 90 degrees in phase with respect to the first reference signal is also compared with the detector output signal for a phase difference. Thus, the output of the phase detector 20 comprises two error signals which were derived by comparing the detector 19 output signal with two reference signals of the same oscillating mirror drive signal frequency but which are separated by 90 degrees phase difference. These two signals are the elevation and azimuth error signals.

The two reference signals are produced by a scan generator 21. This is called a scan generator because it also produces the horizontal and vertical drive signals which are applied to the oscillating mirror assembly 7 through lines 22 and 23. These signals cause the mirror of assembly 7 to oscillate in a pattern by which the star image traces a square path along the edges of the stationary grid 13 when the star 1 is directly sighted by mirror 2. The two output signals of phase detector 20 are generated when the star 1 is off-axis and are each applied to separate power control bridges 24 and 25 for elevation and azimuth control through lines 26 and 27 respectively. The error signals from phase detector 20, which are slow varying D.C. signals, are used to control A.C. power to drive motors 4 and 6. These motors can be two-phase servomotors, for example, one phase of each motor being connected directly to the A.C. power supply, represented in Figure 1 by lines 28 and 29. Lines 30 and 31 are connected to the other phase of each respective servomotor, the A.C. signal in these lines being controlled in magnitude and phase by the power control bridges in accordance with the error signal appearing in lines 26 and 27. In this way the mirror 2 is controlled in both elevation and azimuth whereby the star 1 is continuously tracked. The rotation axes of mirror 2 can be calibrated in degrees from arbitrary reference points such that star altitude and hour angle are indicated on two different dials (not shown) if desired.

Figure 2:
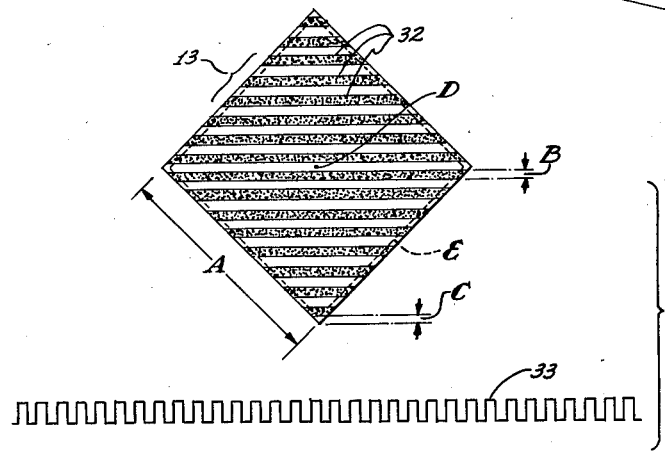
Figure 2 is an enlarged, frontal view of a grid illustrating the grid pattern and the path traced thereon by a star image when the star is centered in the field of view.

An enlarged frontal view of grid 13 is shown in Figure 2. The shape of the grid is that of a square having an edge dimension A of .1169 inch, for example. The grid 13 is photographically reproduced on a thin, flat plate of glass to provide accurately separate opaque stripes 32. These stripes run parallel to a diagonal and are separated by transparent sections of the same width as the stripes. Stripe width dimension B is .005179 inch, for the example shown. The two top and bottom corners which are transparent have a different clear section dimension C of, for example, .002750 inch. The center D of the grid is in the middle of a transparent section. Thus, there is a total of 17 clear spaces and 16 opaque stripes in the grid shown. The oscillating mirror of assembly 7 has two degrees of freedom. By exciting the assembly 7 by suitable signals controlling, say, horizontal, and vertical deflections, the image of star 1 can be made to trace a square path E, which is shown as a broken line, along the edges of the grid 13 when the star 1 is centered in the field of view. Since a photocell 15 is located behind the grid 13, a continuous series of pulses is generated in the photocell output as the star image traces its path around the grid along path E. A pulse is produced each time the star image crosses a transparent section and, for the grid shown in Figure 2, a total of 32 pulses is produced for each complete scan cycle along path E. This output is illustrated by the square wave 33 in this figure. Since this system employs frequency discrimination, it is desirable, in order to realize maximum sensitivity, to have a star pulse output frequency much higher than the scan frequency. The grid of Figure 2 produces star pulses at a frequency which is a 32nd harmonic of the scan frequency since there are 16 opaque stripes and 17 clear spaces (where the two clear spaces at the top and bottom corners are equal to one full clear space) which are traversed by the star image. This requires that the image of the star be smaller than a spacing on the grid (.005 inch) in order that all the energy will pass through to the photocell or be fully blocked by an opaque stripe. Thus the source object tracked should yield an image approaching a point. An all reflective optical system (before the grid) is desirable from this standpoint in view of the very small grid spacings encountered.

Figure 3:
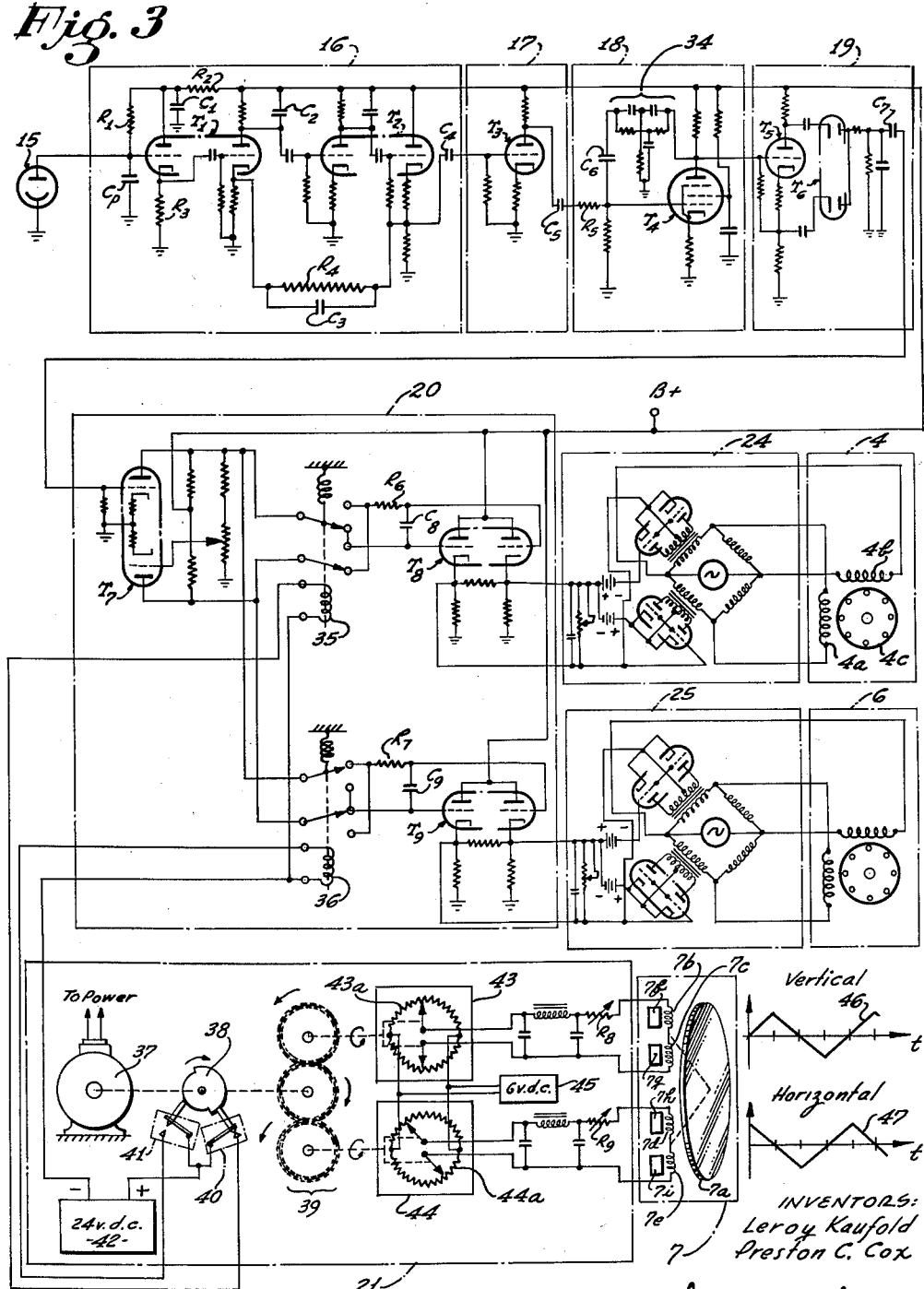
Figure 3 is a detailed wiring diagram of a control network for the automatic single grid tracker.

The control circuitry shown in block diagram form in Figure 1 is given in detail in Figure 3. The photoelectric cell 15 is shown in this figure as the source of input pulses, which are actually generated by motion of the star image across grid 13, to the control circuit. Preamplifier 16 which receives these pulses comprises two dual triodes $T_1$ and $T_2$ connected in four stages. The first triode section of tube $T_1$ is a cathode follower stage, the control grid of which is connected directly to the plate of photocell 15. Resistance $R_1$ is selected to be nearly as equal as possible to the photocell 15 resistance, for example, 4 megohms. Resistance $R_2$, in this instance, is 10 megohms, this value being chosen to provide 22.5 volts at the plate of the first triode section of tube $T_1$. Capacitance $C_p$ is a high frequency by-pass capacitor connected across the photocell 15 as shown to cut down the higher frequency components, to reduce noise in the circuit. Capacitance $C_1$ is a decoupling capacitance of 1 mfd., for example. Resistance $R_3$ is the cathode load resistance and can be of a value of 500 kilohms, for example. These resistances are all high quality, wire wound resistors because they cause lower noise effects in the circuit. The output of the first cathode follower stage is coupled to the second triode section of tube $T_1$ which is connected as an ordinary amplifier. A capacitance $C_2$ connected across the load resistance of this triode section is selected at a value to narrow the pass band by cutting down the higher frequencies. Reducing the pass band has the effect of lowering the noise too. This latter triode section is further coupled to the first triode section of tube $T_2$ which is also an ordinary amplifier stage that is, in turn, coupled to the second triode section of tube $T_2$ which is another cathode follower stage. The cathode of the second triode section of tube $T_1$ is connected to the output of the second cathode follower stage (second section of tube $T_2$) by a parallel resistance $R_4$ and capacitance $C_3$ combination as shown. The purpose of this connection is again to narrow the pass band by inverse feedback of the higher frequencies. The output of this last cathode follower stage is coupled to line amplifier 17 by means of capacitance $C_4$.

Line amplifier 17 consists of a single triode $T_3$, for example, which is connected as an ordinary amplifier. This amplifier stage is connected to the narrow band pass filter 18 by a coupling capacitance $C_5$. Capacitance $C_5$ is connected in series with a resistance $R_5$ which is provided such that parallel-T network 34 does not become overloaded because of the preceding stage 17. The parallel-T network 34 is coupled to resistance $R_5$ by a blocking capacitance $C_6$ and is also connected to the plate of a pentode $T_4$ which provides loop gain for the narrow pass band of signal that is fed to detector 19. Network 34 feeds back all frequencies degeneratively to the input of tube $T_4$ except a very narrow pass band of frequencies. The detector 19 is shown to include a single tube paraphase amplifier $T_5$, the two outputs of which are fully detected by dual diode $T_6$, filtered, then coupled by capacitance $C_7$ to the input of error signal phase detector 20 which includes a two tube (dual triode) paraphase amplifier $T_7$. The input signal to amplifier $T_7$ is actually the envelope of a modulated carrier, the carrier frequency being that of the normal pulse input rate from the photocell 15 and the envelope frequency is the oscillating mirror assembly 7 scan frequency around grid 13.

Filter 18 produces this modulated signal because it has signal building characteristics desirable with a transient type input here encountered. The time sequence of pulses and number per scan cycle vary the phase of the modulation envelope which can be compared by phase detector 20 with reference signals of the mirror assembly 7 scan frequency. When the star is on the optical axis, i.e., in the center of the field, the pulses are continuous and there is no modulation of the carrier out of filter 18.

The scan frequency is fairly low, for example .15 cycle per second. Because of this, error signal phase detector 20 employs a set of relays for efficient phase comparison. These are double pole, two position relays 35 and 36 shown in Figure 3. The double poles of each relay are connected in parallel across the output of amplifier $T_7$, as illustrated. These relays are energized at the scan frequency, each being on for one half of a cycle and off the other half. Relay 35 is energized 90 degrees before relay 36 is, for example. Thus, the poles of relay 35 are cyclically actuated such that the output of amplifier $T_7$ is applied in one direction to the input of the resistance $R_6$ and capacitance $C_8$ network for one half of a cycle and in reversed direction during the other half cycle and, similarly, the poles of relay 36 are cyclically actuated but lagging by 90 degrees so that the same output of amplifier $T_7$ is applied in one direction to the input of the resistance $R_7$ and capacitance $C_9$ network for one half of a cycle and in reversed direction during the other half. The two relays therefore perform a commutating function on the error signal (modulation envelope) for every half cycle of a reference frequency.

Each R-C network $R_6$, $C_8$ and $R_7$, $C_9$ has a long time constant, nearly 6 minutes, for example, and an output is derived across the capacitance of each network. Each output, which can be positive or negative, is the average of the phase compared (half interval inverted) signal, the magnitude corresponding to the star position error in elevation or azimuth. When there are two stars in the field, diametrically opposed, for example, the brighter star is tracked because the average signal is predominantly influenced by this star. For the same reason, a weaker star near the center of the field is tracked rather than a brighter one near the edge of the field. The two control grids of dual triode $T_8$ are connected across capacitance $C_8$ and the grids of dual triode $T_9$ are connected across capacitance $C_9$, as shown in Figure 3. Tubes $T_8$ and $T_9$ are each connected as differential cathode follower stages, the output being taken from across the two cathodes of a dual triode. The two outputs of $T_8$ and $T_9$ constitute the output of error signal phase detector 20 and are, respectively, the elevation and azimuth error signals. These signals are applied to regulate motors 4 and 5 through respective power control bridges 24 and 25 such that the star is continuously tracked. The input to control bridge 24 is a slow varying signal which can be positive or negative, the amplitude of which produces a proportionate A.C. signal to flow in one of the phase windings 4a of drive motor 4. The other phase winding 4b is connected directly across the A.C. supply of control bridge 24 as shown. Rotor 4c is mechanically coupled to drive mirror 2 about the Y axis (Figure 1). The direction of rotor rotation is determined by the polarity of the input signal to control bridge 24. The action of control bridge 25 on motor 6 is similar except in this case, motor 6 actuates the mirror 2 about the Z axis.

Scan generator 21 produces the signals which drive the oscillating mirror assembly 7 and also the signals which actuate relays 35 and 36. These signals are generated by a synchronous motor 37 having a cam 38 affixed to the output shaft and, in addition, gearing 39, as shown, to operate means for producing the proper scan waveforms. Cam 38 is shaped such that switches 40 and 41 are actuated for one half of a revolution of output shaft. These two switches are positioned 90 degrees apart as indicated. Whenever switch 40 is operated (closed) current from a D.C. power supply 42 flows to energize relay 35 and operation of switch 41 correspondingly energizes relay 36.

The synchronous motor 37 runs at the scan frequency of oscillating mirror assembly 7. This mirror assembly 7 is motivated by signals produced from two sawtooth potentiometers 43 and 44 which are driven by gearing 39. A regulated voltage supply 45 impresses 6 volts D.C. across two opposite points of each circular resistance loop 43a and 44a of the potentiometers and an output is secured across a set of two isolated wipers which are separated by 180 degrees, both rotated around each loop. The outputs of these potentiometers 43 and 44 are filtered and applied to actuating coils of oscillating mirror assembly 7. Resistances $R_8$ and $R_9$ are used to adjust the magnitude of output voltage. The diametrical wipers of sawtooth potentiometer 43 bear an instantaneous position orientation of 90 electrical degrees difference from those of potentiometer 44 to produce waveforms 46 and 47 in the coils having the phase relation shown.

Scan generator 21 produces accurate voltage waves 46 and 47 of nearly 12 volts, peak-to-peak, which are applied to coils in mirror assembly 7. There are schematically shown four coils which are actually attached to the back of mirror 7a equally spaced under the center of each quadrant and positioned over separate permanent magnets. Opposite coils are connected in series to form two coil pairs, 7b, 7c and 7d, 7e, each pair determining an axis of oscillation. These two coil pairs, when energized, react with their respective magnets 7f, 7g and 7h, 7i causing mirror 7a to tilt in a vertical (up and down) and horizontal (left and right) direction on application of the exciting input waves. The directions are relative to star sighting. The amount of mirror deflection or tilt follows precisely the input voltages 46 and 47.

The field of view of the telescope 8 (Figure 1) is, for example, 30 minutes of arc. The maximum distance the star 1 can be off center and still be in the field is, therefore, 15 minutes. The star image is moved along the edge of the grid 13 so that a series of pulses is generated by the photocell 15. This signal is, essentially, fed into a filter 18 whose output yields the necessary information for control, after suitable detection. It is to be noted that the filter comprises mainly the means for deriving and distinguishing the input signals for a useful output signal. Thus, the performance of the filter section in discriminating against noise and other signals not characterized primarily by the effect of grid modulation is a limiting factor in resolving a high noise level input. Filter response to the pulse input from photocell 15 due to action of grid 13 is at an optimum, in respect to signal to noise ratio, when operated at a certain frequency and filter bandwidth.

Figure 4:
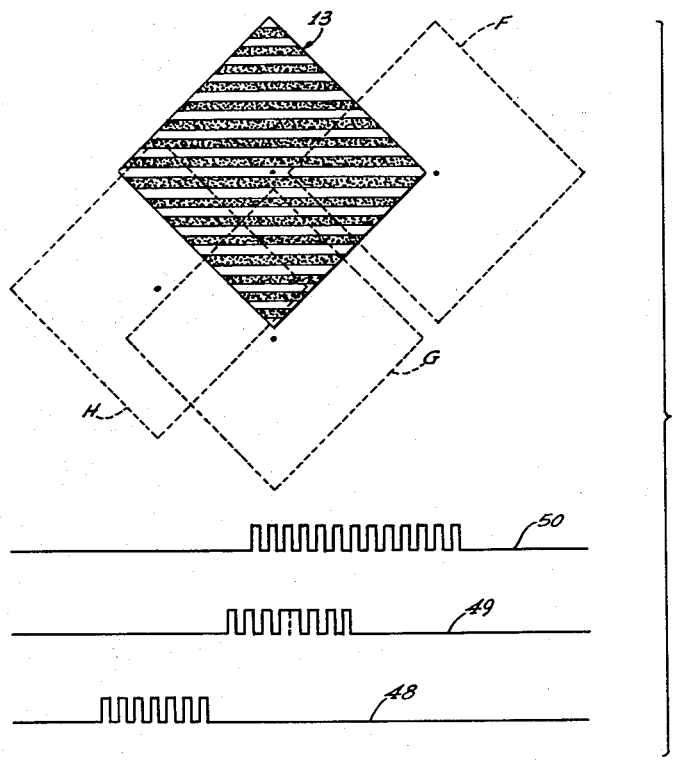
Figure 4 is a drawing of an enlarged frontal view of the focal plane grid showing different paths traced by a star image for various maximum off-axis conditions of star displacement.

Referring now to Figure 4, grid 13 is reproduced in an enlarged view. There are three square traces F, G and H which are shown in broken lines to indicate the path made by the tracked star being off center on the horizontal axis only, off on the vertical axis only and off in a direction which is a combination of horizontal and vertical displacement, respectively. The output pulses for a mirror scan cycle are illustrated as curves 48, 49 and 50 corresponding to traces F, G and H. The timewise relation of output pulses determines the position of the star in the field as can be seen from examination of Figure 4. These pulses, for a group, gradually build up the output of the bandpass filter into which they are fed. The pulse groups of 48, 49 and 50 represent conditions wherein the star is displaced at the maximum distance (15 minutes of arc) from center and therefore are the weakest signals encountered. Of these three examples, pulse group 49, for which the star is off-axis in a vertical direction only, has an additional effect of a pulse having a phase shift of 180 degrees. This phase shift occurs at the middle of pulse group 49 and has the effect of cancelling the signal that is being built up at the filter output. Thus, it is apparent that the weakest obtainable signal will occur when the star is 15 minutes off center in the vertical direction for the grid shown having a square scan path.

The first four pulses just before a 180 degree phase shift occurs in the pulse wave 49, are insufficient to build the filter output up to a steady state signal, hence the input signal to the filter must be considered a transient signal. An analysis to determine the maximum amplitude of this minimum (weakest) output signal was made using as input, four pulses expressed as a series of positive and negative unit step functions which are appropriately displaced in time. This input was applied to a filter defined by the transfer function $$\frac{bw_0}{s^2+bs+w_0^2}$$

in which: $b$ is the bandwidth of the filter, $w_0$ is the pulse output frequency and $s$ is the complex variable of the Laplace transformation. The solution, or response of the filter, and data from laboratory tests on the lead sulfide cell were provided to analogue computer facilities which established a maximum signal to noise ratio output for tracker operation with a .5 cycle bandwidth at a pulse or carrier frequency of 5 c.p.s. The laboratory tests further showed that the tracker operates equally well during either daytime or nighttime. This is by reason of the highly selective characteristics of the lead sulfide photocell. The embodiment shown, when operated at the prescribed bandwidth and scan frequency, can produce a signal to noise ratio of at least 2 to 1 from a second magnitude, type GO star. It is to be remembered that this result is based upon the worst conditions when the weakest obtainable signal occurs.

While in order to comply with the statute, the invention has been described in language more or less specific as to structural features, it is to be understood that the invention is not limited to the specific features shown, but that the means and construction herein disclosed comprises a preferred form of putting the invention into effect, and the invention is therefore claimed in any of its forms or modifications within the legitimate and valid scope of the appended claims.

What is claimed is:

1. Means for the automatic tracking of a radiant point source object, comprising: means for sighting and focusing on a focal plane the image of a selected radiant point source object; means for displacing said image to trace a path on said focal plane; means for interrupting said image at said focal plane to produce a periodic signal, said means for interrupting said image including a stationary grid having opaque and clear sections; means for interpreting said periodic signal; and means for orienting said sighting means according to the interpretation of said periodic signal.

2. Apparatus in accordance with claim 1 wherein said means for displacing said image includes an oscillatory mirror having two degrees of freedom.

3. Means for the automatic tracking of a radiant point source object, comprising: reflecting means for sighting a selected radiant point source object, said reflecting means positionable in elevation and azimuth; optical means cooperating with said reflecting means for focusing the image of said radiant point source on a focal plane; means for displacing said image to trace a path on said focal plane; means located at said focal plane for interrupting said image as it traces said path on said focal plane; photosensitive means for generating a pulse output according to the interruption of said image; amplifying means for amplifying said pulse output; means for filtering said pulse output of spurious signals of frequencies apart from said pulse output frequency to produce a carrier modulated according to the occurrence of pulses in the output; means for detecting the envelope of said modulated carrier; means for inverting said envelope signal periodically every half cycle of image displacing reference frequency for an average first output signal; means for inverting said envelope signal periodically every half cycle of another reference frequency separated by 90 degrees phase difference from said former reference frequency for an average second output signal; and means independently responsive to said first and second output signals to position said reflecting means in elevation and azimuth to continuously track said source object.

4. Apparatus in accordance with claim 3 wherein said optical means includes reflecting surfaces only and said photosensitive means is infrared sensitive.

5. Apparatus in accordance with claim 3 wherein said means for interrupting said image includes a stationary square grid having clear and opaque sections parallel to a diagonal.

6. Apparatus in accordance with claim 3 wherein said means for displacing said image includes an oscillating mirror having two degrees of freedom, said oscillating mirror activated to displace said image to trace a closed path on said focal plane.

7. Apparatus in accordance with claim 3 wherein said means for inverting said envelope signal include independent relays connected to reverse said envelope signal at each relay output when said relays are energized.

8. Apparatus in accordance with claim 3 wherein said means responsive to said first and second output signals include independent power control bridges connected to control respective sighting mirror elevation and azimuth drive motors.

9. Apparatus in accordance with claim 3 wherein said means for filtering said pulse output includes in combination, a parallel-T network connected across an amplifier, said parallel-T network degeneratively feeding back all frequencies except a narrow pass band.

10. In an automatic star tracker having optical means for perceiving and focusing on a focal plane the image of a selected star, scanning means, comprising: means for displacing said image to trace a path on said focal plane, said displacing means including an oscillating mirror having two degrees of freedom for displacing said image in a linear closed path on said focal plane; and means located in said focal plane for periodically interrupting said image as it traces said path on said focal plane.

11. Apparatus in accordance with claim 10 wherein said interrupting means include a stationary grid having opaque and clear sections positioned in said focal plane whereby the transmission of said image is periodically interrupted as it traces said path across said grid.

12. Apparatus in accordance with claim 11 wherein said stationary grid is square having a plurality of alternately opaque and clear sections of equal width parallel to a diagonal of said square.

13. Apparatus in accordance with claim 12 wherein said path traced by said image coincides with the edges of said square grid.

14. In an automatic star tracker having optical means for perceiving and focusing on a focal plane the image of a selected star, scanning means, comprising: an oscillating mirror having two degrees of freedom for displacing said image in a square path on said focal plane; and a square stationary grid having alternate clear and opaque sections parallel to a diagonal positioned in said focal plane, said image being traced in a path along the edges of said square whereby the transmission of said image is periodically interrupted by said opaque sections as it traces said path across said grid.

15. Apparatus in accordance with claim 14 including scan generator means for displacing said oscillating mirror in a square path on said focal plane.

16. Apparatus in accordance with claim 15 wherein said scan generator means provide separate outputs differing by 90 degrees phase difference to control said oscillating mirror in the two degrees of freedom whereby a square path is traced on said focal plane.

References Cited in the file of this patent

UNITED STATES PATENTS 2,462,925    Varian _____ Mar. 1, 1949